(12) United States Patent
Wang et al.

(10) Patent No.: US 9,660,241 B2
(45) Date of Patent: May 23, 2017

(54) NASICON-POLYMER ELECTROLYTE STRUCTURE

(71) Applicant: Sharp Laboratories of America, Inc., Camas, WA (US)

(72) Inventors: Long Wang, Vancouver, WA (US); Yuhao Lu, Vancouver, WA (US); Jong-Jan Lee, Camas, WA (US); Sean Vail, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 348 days.

(21) Appl. No.: 14/198,755

(22) Filed: Mar. 6, 2014

(65) Prior Publication Data

US 2014/0186719 A1   Jul. 3, 2014

Related U.S. Application Data

(63) Continuation-in-part of application No. 14/198,702, filed on Mar. 6, 2014, now Pat. No. 9,583,751, which
(Continued)

(51) Int. Cl.
*H01M 4/58* (2010.01)
*H01M 2/16* (2006.01)
(Continued)

(52) U.S. Cl.
CPC ........... *H01M 2/1686* (2013.01); *C01B 17/02* (2013.01); *C01B 19/02* (2013.01); *C01B 25/003* (2013.01);
(Continued)

(58) Field of Classification Search
CPC ........ H01M 4/58; H01M 4/04; H01M 4/5825; H01M 2/1653; Y10T 29/49108
See application file for complete search history.

(56) References Cited

U.S. PATENT DOCUMENTS 4,977,007 A * 12/1990 Kondo ................. G02F 1/1525
                                                  264/104
2010/0039690 A1* 2/2010 Agrawal .................. G02F 1/15
                                                  359/265
(Continued)

OTHER PUBLICATIONS

Harry et al., Detection of subsurface structures underneath dendrites formed on cycled lithium metal electrodes, DOI:10.1038/NMAT7393.
(Continued)

*Primary Examiner* — Mark F Huff
*Assistant Examiner* — Monique Wills
(74) *Attorney, Agent, or Firm* — Law Office of Gerald Maliszewski; Gerald Maliszewski

(57) ABSTRACT

A method is provided for forming a sodium-containing particle electrolyte structure. The method provides sodium-containing particles (e.g., NASICON), dispersed in a liquid phase polymer, to form a polymer film with sodium-containing particles distributed in the polymer film. The liquid phase polymer is a result of dissolving the polymer in a solvent or melting the polymer in an extrusion process. In one aspect, the method forms a plurality of polymer film layers, where each polymer film layer includes sodium-containing particles. For example, the plurality of polymer film layers may form a stack having a top layer and a bottom layer, where with percentage of sodium-containing particles in the polymer film layers increasing from the bottom layer to the top layer. In another aspect, the sodium-containing particles are coated with a dopant. A sodium-containing particle electrolyte structure and a battery made using the sodium-containing particle electrolyte structure are also presented.

10 Claims, 3 Drawing Sheets

Related U.S. Application Data is a continuation-in-part of application No. 14/198,663, filed on Mar. 6, 2014, now Pat. No. 9,537,131, which is a continuation-in-part of application No. 14/193,782, filed on Feb. 28, 2014, which is a continuation-in-part of application No. 14/193,501, filed on Feb. 28, 2014, now Pat. No. 9,406,919, which is a continuation-in-part of application No. 14/174,171, filed on Feb. 6, 2014, now Pat. No. 9,455,431, which is a continuation-in-part of application No. 14/067,038, filed on Oct. 30, 2013, now Pat. No. 9,450,224, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, now Pat. No. 9,559,358, which is a continuation-in-part of application No. 13/432,993, filed on Mar. 28, 2012, now Pat. No. 9,269,953.

(51) Int. Cl.

| | |
|---|---|
| *C01C 3/12* | (2006.01) |
| *H01M 4/136* | (2010.01) |
| *H01M 4/04* | (2006.01) |
| *H01M 4/62* | (2006.01) |
| *H02J 7/00* | (2006.01) |
| *H01M 4/134* | (2010.01) |
| *H01M 4/1395* | (2010.01) |
| *C01B 17/02* | (2006.01) |
| *C01B 19/02* | (2006.01) |
| *C01B 25/00* | (2006.01) |
| *C01B 31/00* | (2006.01) |
| *C01B 33/021* | (2006.01) |
| *C01D 1/02* | (2006.01) |
| *C01D 15/02* | (2006.01) |
| *H01M 4/131* | (2010.01) |
| *H01M 4/133* | (2010.01) |
| *H01M 4/1391* | (2010.01) |
| *H01M 4/38* | (2006.01) |
| *H01M 4/485* | (2010.01) |
| *H01M 4/505* | (2010.01) |
| *H01M 4/56* | (2006.01) |
| *H01M 4/587* | (2010.01) |
| *H01M 10/054* | (2010.01) |
| *H01M 10/0525* | (2010.01) |
| *H01M 10/0565* | (2010.01) |
| *H01M 4/1397* | (2010.01) |
| *H01M 2/14* | (2006.01) |
| *H01M 10/056* | (2010.01) |
| *H01M 10/052* | (2010.01) |

(52) U.S. Cl.
CPC ............ *C01B 31/00* (2013.01); *C01B 33/021* (2013.01); *C01C 3/12* (2013.01); *C01D 1/02* (2013.01); *C01D 15/02* (2013.01); *H01M 2/14* (2013.01); *H01M 2/1653* (2013.01); *H01M 4/04* (2013.01); *H01M 4/0404* (2013.01); *H01M 4/049* (2013.01); *H01M 4/0416* (2013.01); *H01M 4/0452* (2013.01); *H01M 4/0471* (2013.01); *H01M 4/0495* (2013.01); *H01M 4/0497* (2013.01); *H01M 4/131* (2013.01); *H01M 4/133* (2013.01); *H01M 4/134* (2013.01); *H01M 4/136* (2013.01); *H01M 4/1391* (2013.01); *H01M 4/1395* (2013.01); *H01M 4/1397* (2013.01); *H01M 4/38* (2013.01); *H01M 4/381* (2013.01); *H01M 4/382* (2013.01); *H01M 4/387* (2013.01); *H01M 4/485* (2013.01); *H01M 4/505* (2013.01); *H01M 4/56* (2013.01); *H01M 4/58* (2013.01); *H01M 4/587* (2013.01); *H01M 4/5825* (2013.01); *H01M 4/628* (2013.01); *H01M 10/054* (2013.01); *H01M 10/056* (2013.01); *H01M 10/0525* (2013.01); *H01M 10/0565* (2013.01); *H02J 7/0042* (2013.01); *H01M 10/052* (2013.01); *Y02E 60/122* (2013.01); *Y10T 29/49108* (2015.01)

(56) References Cited

U.S. PATENT DOCUMENTS

2010/0119800 A1* 5/2010 Yokoyama ............ C04B 35/475
428/220
2012/0328936 A1* 12/2012 Wessells ............ H01M 10/054
429/188

OTHER PUBLICATIONS

Xu et al, Lithium Metal Anode for Rechargeable Batteries, Energy Environ. Sci., 2013, DOI: 10.1039/C3EE40795K.
Kumar et al., Ionic liquid based sodium ion conducting gel polymer electrolytes, Solid State Ionics 181 (2010) 416-423.
Samitsu et al., Flash freezing route to mesoporous polymer nanofibre networks, DOI: 10.1038/ncomms3653.
Agrawal et al., Solid polymer electrolytes: materials designing and all-solid-state battery applications: an overview, J. Phys. D: Appl. Phys. 41 (2008) 223001 (18pp).
Patel et al., Increasing ionic conductivity of polymer-sodium salt complex by addition of a non-ionic plastic crystal, Solid State Ionics 181 (2010) 844-848.
Anantharamulu et al., A wide-ranging review on Nasicon type materials, J Mater Sci (2011) 46:2821-2837 DOI 10.1007/s10853-011-5302-5.
Palomares et al., Na-ion batteries, recent advances and present challenges to become low cost energy storage systems, Energy Environ. Sci., 2012, 5, 5884.

* cited by examiner

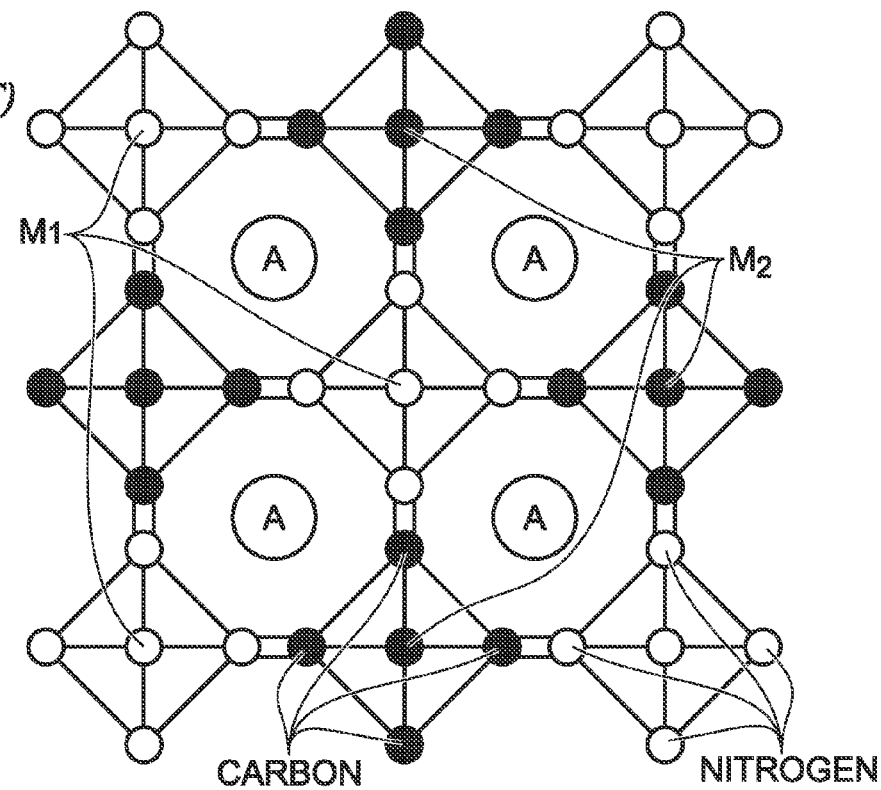
Fig. 1 (PRIOR ART)
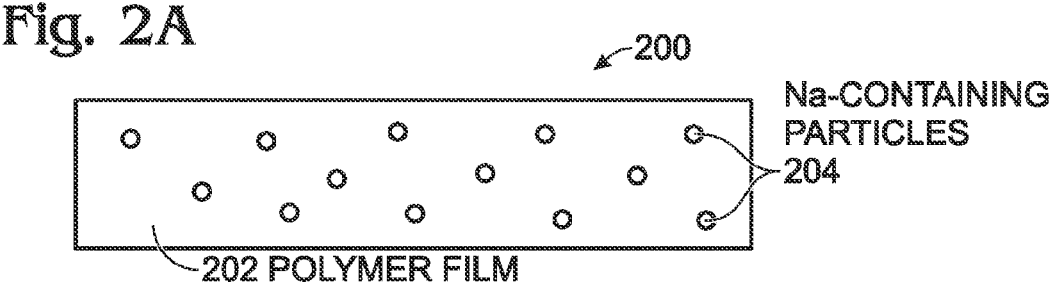
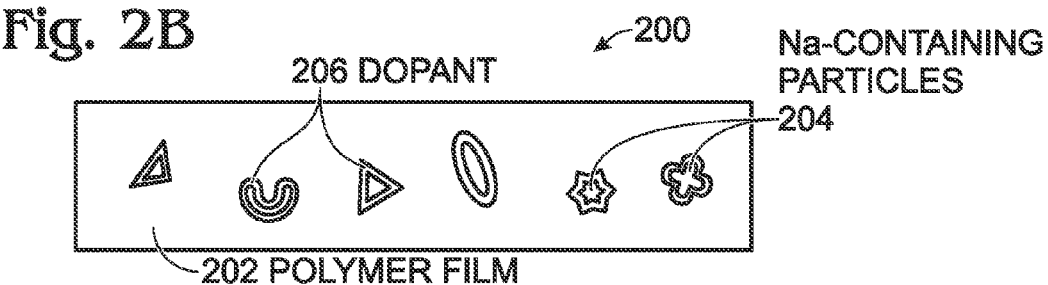

NASICON-POLYMER ELECTROLYTE STRUCTURE

RELATED APPLICATIONS

This application is a Continuation-in-Part of an application entitled, BATTERY WITH AN ANODE PRELOADED WITH CONSUMABLE METALS, invented by Yuhao Lu et al, Ser. No. 14/198,702, filed Mar. 6, 2014;

which is a Continuation-in-Part of an application entitled, BATTERY ANODE WITH PRELOADED METALS, invented by Long Wang et al, Ser. No. 14/198,663, filed Mar. 6, 2014;

which is a Continuation-in-Part of an application entitled, METAL BATTERY ELECTRODE WITH PYROLYZED COATING, invented by Yuhao Lu et al, Ser. No. 14/193,782, filed Feb. 28, 2014;

which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014;

which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

This application is a Continuation-in-Part of an application entitled, SODIUM IRON(II)-HENACYANOFERRATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HENACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical cells and, more particularly, to a method of fabrication and associated sodium-containing particle electrolyte structure.

2. Description of the Related Art

The rechargeable lithium ion battery (LIB) has triggered the portable electronic devices revolution due to its high power density, long cycling life, and environmental compatibility. The rechargeable LIB consists of a cathode (positive electrode) and an anode (negative electrode), separated by a $Li^+$-ion permeable membrane. A solution or polymer containing lithium-ions is also used in the battery so that $Li^+$-ions can "rock" hack and forth between the positive and negative electrode freely. The positive materials are typically transition-metal oxides such as lithium cobalt oxide ($LiCoO_2$), lithium manganese oxide ($LiMn_2O_4$), lithium iron phosphate ($LiFePO_4$), and their derivatives. Lithium-ions can move in their interstitial space freely and reversibly. The negative electrode materials can use lithium-metal, alloys, and carbonaceous materials. During discharge, $Li^+$-ions are extracted from the negative electrode and inserted into the positive electrode. In the meantime, electrons pass through an external circuit from the negative electrode to the positive electrode and generate electric power. During a charge, ions and electrons move along the reverse direction and go back to their original places.

Although LIBs have been employed successfully over a broad range of commercial applications, the issue of lithium demand, as it applies to both strain on natural resources and potential fluctuations in price, have motivated the development of low-cost, rechargeable battery technologies as alternatives to LIB. In light of this, sodium-ion batteries (NIBs) have received increased attention due primarily to the fact that sodium has comparable properties to lithium but also boasts the benefits of reduced cost and virtually unlimited supply.

Unfortunately, rechargeable batteries that employ lithium metal (or sodium metal) as the anode are subject to failure mechanisms associated with the formation of "dendrites" on the metal anode surface, which arise as a consequence of non-uniform surface deposition (electroplating) during the charge process. In the case of a lithium metal anode, the evidence of dendrite formation is unambiguous and is characterized by the formation of discrete, rigid surface structures capable of physically penetrating through a separator/membrane (interposed between and therefore isolating anode from cathode) to reach the cathode surface [1]. As a result of this contact between anode and cathode, an electrical "shorting" occurs which can degrade battery performance and/or pose significant safety hazards. With respect to using a sodium metal as an anode, the formation of dendritic structures during charging has been shown to proceed with the liberation of sodium particles that are dispersed in the electrolyte due to the fact that sodium is a "softer" metal than lithium. The subsequent migration of suspended Na particles in the liquid electrolyte to the cathode can lead to electrical "shorting" and depletion of anode material (consumption of Na metal), leading to reduced capacity and chemical reaction(s) with the active/inactive components comprising the cathode.

In light of the technical challenges associated with Na dendrite formation during charging, several strategies have been investigated as alternatives to conventional (liquid) electrolyte systems in NIBs. In some cases, polymeric or polymer gel electrolytes and various composites thereof) have been considered since the polymeric matrices are expected to impede the free migration of Na particles [2]. With respect to the polymeric (gel) electrolytes, high porosity and low crystallinity are desired attributes for the polymer matrix, which are correlated with the ability to both take-up and retain large volumes of liquid electrolyte (containing dissolved $Na^+$ salt). Numerous approaches have been reported for creating porous polymer gel electrolytes including, but not limited to, inclusion of plasticizers during processing, integration of ceramic "fillers" to furnish composite materials, the application of phase inversion (PI) techniques, and the flash-freezing of solvated polymer matrices [3, 4].

Of course, the beneficial impact of high porosity is directly related to the existence of conductive channels through which $Na^+$ ions can flow during battery cycling. Unfortunately, the same conductive channels function as pathways through which Na particles can flow from anode to cathode. Therefore, it is likely that there exists an optimal pore size (and/or pore size distribution) for realizing high ionic conductivity for $Na^+$, while at the same time effectively suppressing Na particle migration from anode to cathode.

In contrast, solid polymeric electrolytes offer the advantage of being "liquid-free" so that Na particles liberated from the surface of the sodium metal anode are not free to flow towards the cathode. Unfortunately, solid polymeric electrolytes conventionally demonstrate low ionic conductivities at room temperature, while significant contact resistance arising between polymer electrolyte/electrode interfaces limits battery performance [5, 6].

Finally, solid-state (ceramic, nonpolymer) electrolytes can offer advantages in terms of high Na conductivity while functioning as a physical barrier against Na particle formation/migration. However, these materials suffer from drawbacks that include high manufacturing costs, physical rigidity that places limitations on the battery architecture (or form), and performance/stability that is sensitive to stoichiometry and/or the presence of contaminants (secondary phases) [7, 8].

FIG. 1 is a diagram depicting the crystal structure of a metal hexacyanometallate (MHCM) (prior art). Transition MHCFs can be categorized into a more general group of MHCMs that have the open framework as shown. MHCMs can be expressed as $A_X M1_Y M2_Z(CN)_{N}·_M H_2O$, where A can be selected from, but not limited to alkali and alkaline metals, and M1 and M2 are transition metals such as titanium (Ti), vanadium (V), chrome (Cr), manganese (Mn), iron (Fe), cobalt (Co), nickel (Ni), copper (Cu), zinc (Zn), calcium (Ca), magnesium (Mg), etc. M1 and M2 can be the same or a different metal. The ratio (X:N) of M1 and M2 varies, depending on the materials used. In addition, various amounts of water ($H_2O$) can occupy in interstitial or lattice positions of MHCMs.

It would be advantageous if an electrolyte and/or ion-permeable membrane existed that promoted the migration metal ions between an anode and cathode, while discouraging the formation of metal dendrites.

[1] K. J. Harry, D. T. Hallinan, D. Y. Parkinson, A. A. MacDowell, N. P. Balsara, "Detection of subsurface structures underneath dendrites formed on cycled lithium metal electrodes," Nature Mater. (2014), DOI: 10.1038/NMAT3793.

[2] W. Xu, J. Wang, F. Ding, X. Chen, E. Nasybulin, Y. Zhang and J. Zhang, "Lithium metal anode for rechargeable batteries," Energy Environ. Sci., 7(2014) 513.

[3] D. Kumar, S. A. Hashmi, "Ionic liquid based sodium ion conducting gel polymer electrolytes", Solid State Ionics, 181 (2010) 416.

[4] S. Samitsu, R. Zhang, X. Peng, M. R. Krishnan, Y. Fujii, I. Ichinose, "Flash freezing route to mesoporous polymer nanofibre networks", Nature Comm. 4(2013) 2653.

[5] R. C. Agrawal, G. P. Pandey, "Solid polymer electrolytes: materials designing and all-solid-state battery applications: an overview," J. Phys. D: Appl. Phys. 41(2008) 223001.

[6] M. Patel, K. G. Chandrappa, A. J. Bhattacharyya, "Increasing ionic conductivity of polymer-sodium salt complex by addition of a non-ionic plastic crystal," Solid State Ionics 181 (2010) 844.

[7] N. Anantharamulu, K. K. Rao, G. Rambabu, B. V. Kumar, V. Radha, M. Vithal, "A wide-ranging review on Nasicon type materials," J. Mater. Sci. 46 (2011) 2821.

[8] V. Palomares, P. Serras, I. Villaluenga, K. B. Hueso, J. Carretero-Gonzalez, T. Rojo, "Na-ion batteries, recent advances and present challenges to become low cost energy storage systems," Energy Environ. Sci. 5 (2012) 5884.

SUMMARY OF THE INVENTION

Disclosed herein is a strategy for reconciling the technical challenges associated with sodium (Na) dendrite formation (and subsequent migration) for rechargeable batteries employing sodium metal as an anode. Furthermore, the technology is not limited to sodium metal, but is amenable to alternative anodes and anode materials (hard carbon, for example) for which sodium dendrite growth may occur. Overall, it is asserted that resolution of the Na dendrite issue is critical towards realizing the practical, wide-scale deployment of sodium battery technology with sodium metal and/or other dendrite "prone" anodes.

Specifically, the technology includes the design and fabrication of $Na_3Zr_2PSi_2O_{12}$ (NASICON)-polymer composite structures (films, for example) as electrolyte matrices for rechargeable sodium battery with sodium metal and/or other dendrite prone anodes. In one aspect, an appropriate polymeric material functions as a host matrix for NASICON particles. Owing to its intrinsic properties, the NASICON particles serve as ionic conductors for $Na^+$, with the polymeric matrix supplementing sodium ion conductivity while, at the same time, providing a "form" for the electrolyte matrix, to maintain the mechanical integrity of the polymeric electrolyte. Several compositional and configurational variations are presented below.

Accordingly, a method is provided for forming a sodium-containing particle electrolyte structure. The method provides sodium-containing particles, dispersed in a liquid phase polymer, to form a polymer film with sodium-containing particles distributed in the polymer film. The liquid phase polymer is a result of dissolving the polymer in a solvent or melting the polymer. The sodium-containing particles may be dispersed either during or after liquefaction. The dispersion can be aided with the use of agitation, sonication, and elevated temperatures. The sodium-containing particles have a size in the range between 1 nanometer and 100 microns, and a size distribution in a range between one order of magnitude and five orders of magnitude.

Some examples of polymer materials are: poly(ethylene oxide) (PEO), poly(acrylonitrile) (PAN), poly(methyl metacrylate) (PMMA), poly(vinyl chloride) (PVC), poly (vinylidene fluoride) (PVdF), poly(vinylidene fluoride-co-hexafluoropropylene) (PVdF), poly(tetrafluoroethylene) (PTFE), poly(vinyl acetate) (PVAc), poly(vinyl alcohol) (PVA), poly(styrene) (PS), poly(p-pheneylene oxide) (PPO), poly(ethylene terephthalate) (PET), poly(vinyl pyrrolidinone) (PVP), poly (vinyl butyral) (PVB), polyethylene (PE), polypropylene (PP), poly(imides)s (PIs), poly(urethane)s (PUs), poly(siloxane), functional derivatives of the above-listed materials, and binary/ternary blends of the above-listed materials.

In one aspect, the method forms a plurality of polymer film layers, where each polymer film layer includes sodium-containing particles. For example, the plurality of polymer film layers may form a stack having a top anode layer and a bottom cathode layer, where the percentage of sodium-containing particles in the polymer film layers is graded, increasing in percentage from the bottom cathode layer to the top anode layer. In another aspect, the sodium-containing particles are coated with a dopant such as metal ions, organic moieties, inorganic moieties, or hybrid organic/inorganic moieties.

Some example of sodium-containing particle materials include NASICON and thio-NASICON materials such as $NaX_2(PS_4)_3$, where X may be titanium (Ti), germanium (Ge), zirconium (Zr), or tin (Sn), $Na_3PS_4$, or $Na_3(PO4)_X(PS_4)_{1-X}$, where (0<X<1).

Additional details of the above-described method, a sodium-containing particle electrolyte structure, and a battery made using the sodium-containing particle electrolyte structure are presented below.

BRIEF DESCRIPTION OF THE DRAWINGS

FIG. 1 is a diagram depicting the crystal structure of a metal hexacyanometallate (MHCM) (prior art).

FIGS. 2A through 2E are partial cross-sectional views of a sodium-containing particle electrolyte structure.

DETAILED DESCRIPTION

Figure 2D:
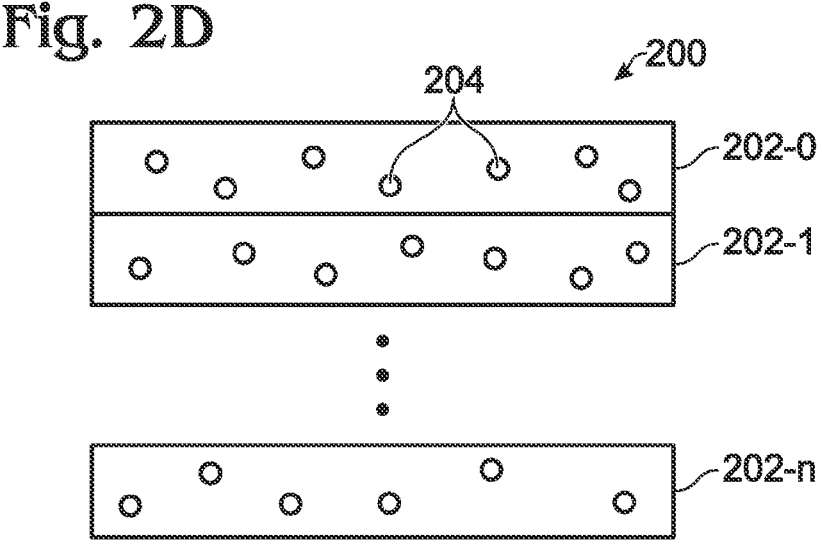

FIGS. 2A through 2E are partial cross-sectional views of a sodium-containing particle electrolyte structure. As shown in FIG. 2A, the sodium-containing electrolyte structure 200 comprises a polymer film 202, and sodium-containing particles 204 distributed in the polymer film. The sodium-containing particles 204 have a size (diameter) in the range between 1 nanometer and 100 microns, and a size distribution in the range between one order of magnitude and five orders of magnitude.

The polymer film 202 may be one of the following materials: poly(ethylene oxide) (PEO), poly(acrylonitrile) (PAN), poly(methyl metacrylate) (PMMA), poly(vinyl chloride) (PVC), poly(vinylidene fluoride) (PVdF), poly(vinylidene fluoride-co-hexafluoropropylene) (PVdF), poly (tetrafluoroethylene) (PTFE), poly(vinyl acetate) (PVAc), poly(vinyl alcohol) (PVA), poly(styrene) (PS), poly(p-pheneylene oxide) (PPO), poly(ethylene terephthalate) (PET), poly(vinyl pyrrolidinone) (PVP), poly (vinyl butyral) (PVB), polyethylene (PE), polypropylene (PP), poly(imides)s (PIs), poly(urethane)s (PUs), poly(siloxane), functional derivatives of the above-listed materials, and binary/ternary blends of the above-listed materials. Although not explicitly depicted, the polymer film 200 may include a plasticizer that has a high dielectric constant and a low molecular weight in the form of a salt, solvent, or polymer, Such a plasticizer may be used to improve conductivity by enhancing the dissociation of salt pairs.

The sodium-containing particles may be $Na_3Zr_2PSi_2O_{12}$ (NASICON) or thio-NASICON materials such as $NaX_2(PS_4)_3$, where X is titanium (Ti), germanium (Ge), zirconium (Zr), or tin (Sn), $Na_3PS_4$, or $Na_3(PO_4)_X(PS_4)_{1-X}$, where (0<x<1). The sodium-containing particles may have a spherical shape, as shown in FIG. 2A, an irregular shape (FIG. 2B), a plate or sheet shape (FIG. 2C), or combinations of the above-listed shapes.

FIG. 2B depicts the sodium-containing particles 204 coated with a dopant 206 such as metal ions, organic moieties, inorganic moieties, or hybrid organic/inorganic moieties.

FIG. 2D depicts a sodium-containing electrolyte structure with a plurality of polymer film layers 202-0 through 202-n, where n is an integer greater than or equal to 1. Each polymer film layer 202-0 through 202-n includes sodium-containing particles 204. In one aspect, the plurality of polymer film layers 202-0 through 202-n are formed from a corresponding plurality of polymer materials, meaning that the polymer materials that make up a layer may be the same or different that the polymer material in other layers.

Figure 2C:
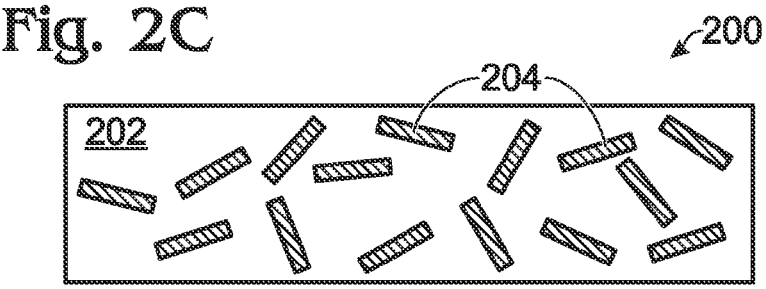
Figure 2E:
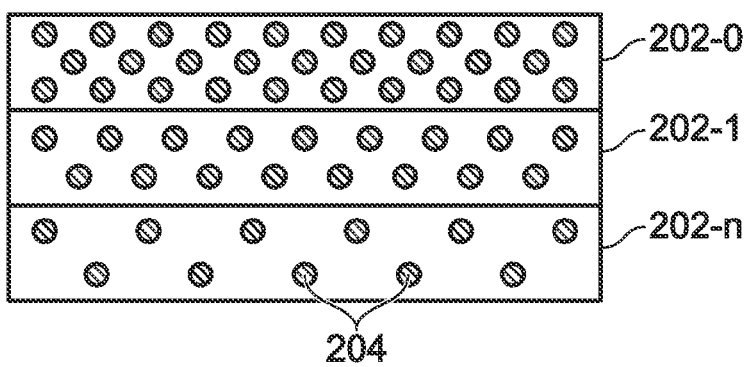

FIG. 2E depicts sodium-containing electrolyte structure with a plurality of graded polymer film layers, where n=2. The polymer film layers 202-0 through 202-n form a stack having a top anode layer and a bottom cathode layer. As used herein, the top anode layer 202-0 refers to the layer most likely to interface with a battery anode. The word "top" is used in a relative sense and is not intended to limit the sodium-containing electrolyte structure 200 to any particular orientation. Likewise, the bottom cathode layer 202-n refers to the layer most likely to interface with a battery cathode. In this aspect, the percentage of sodium-containing particles 204 in the polymer film layers is graded, increasing in percentage from the bottom cathode layer 202-n to the top anode layer 202-0. In one aspect, the plurality of polymer film layers 202-0 through 202-n are formed from a corresponding plurality of polymer materials, meaning that the polymer materials that make up a layer may be the same or different that the polymer material in other layers.

Figure 3:
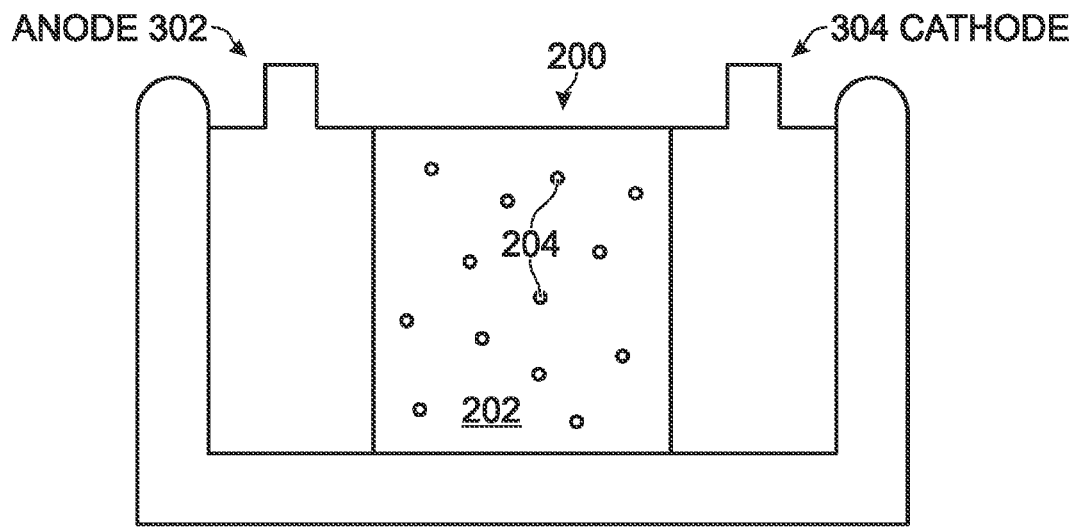
FIG. 3 is a partial cross-sectional view of a battery with a sodium-containing particle electrolyte structure.

FIG. 3 is a partial cross-sectional view of a battery with a sodium-containing particle electrolyte structure. The battery 300 comprises an anode 302, which comprises a material such as alkali metals, alkaline earth metals, carbon, metals capable of being alloyed with alkali or alkaline earth metals, intercalation oxides, electrochemically active organic compounds, and combinations of the above-listed materials.

The cathode 304 comprises $M1_YM2_Z(CN)_N \cdot mH_2O$;
where M1 and M2 are transition metals;
where Y is less than or equal to 1;
where z is less than or equal to 1;
where N is less than or equal to 6; and,
where M is less than or equal to 20.

The battery 300 also comprises a sodium-containing particle electrolyte structure 200, which in turn comprises a polymer film 202 and sodium-containing particles 204 distributed in the polymer film. Details of the sodium-containing particle electrolyte structure 200 are presented above in the descriptions of FIGS. 2A-2E and are not repeated here in the interest of brevity.

Although not explicitly shown, solid electrolyte interface (SEI) layers may be formed on the anode, cathode, or both the anode and cathode. Also not shown, a polymeric binder such as polytetrafluoroethylene (PTFE) or polyvinylidene difluoride (PVDF) may be used to provide adhesion between electrode materials and current collectors to improve the overall physical stability.

Details have been presented for integrating NASICON and NASICON like materials with a polymer to form composite materials for rechargeable sodium battery applications. Overall, the result is a mechanically robust, highly $Na^+$ conductive electrolyte composite capable of mitigating the deleterious impact of Na dendrite formation (through suppression of dendrite growth and/or physical blocking of formed dendrites) in rechargeable batteries employing sodium metal and/or other Na dendrite prone anodes.

The sodium-containing particles are dispersed in a polymer matrix and subsequently deposited as a film. The sodium-containing particles may consist of a narrow or wide size distribution and may be nanometers to microns in dimension. In one variation, the polymer(s) employed as matrices are amenable to solution processing (soluble in organic solvents or water) and, separately, demonstrate electrochemical stability over appropriate (operating) voltage ranges for practical battery application. In most cases, the polymer is chemically/electrochemically inert towards the electrode materials but this is not an absolute requirement.

In the case of solution processing of the sodium-containing polymer composites, the sodium-containing particles are dispersed in a solution of polymer containing an appropriate solvent or combination of solvents (for polymer dissolution) while the sodium-containing particles may be added in during polymer dissolution, or following complete polymer dissolution. Furthermore, dissolution of the polymer and creation of a sodium-containing particle dispersion within the polymer solution can be facilitated with the aid of agitation (stirring, shaking) or sonication, and may proceed under ambient conditions or at elevated temperatures as appropriate. Subsequently, a sodium-containing polymer composite film can be fabricated using conventional methodologies including spin-coating, blade-casting, drop-casting, spray coating, etc.

Spin coating is a procedure used to deposit uniform thin films on flat substrates. A small amount of coating material is applied on the center of the substrate, which is either spinning at low speed or not spinning at all. The substrate is then rotated at high speed in order to spread the coating material by centrifugal force.

Doctor blade-casting is procedure where a doctor blade is used to wipe off the excess coating on the roller or the flat substrate, and then the wiped coating is deposited onto a substrate.

Drop-casting is the application of a thin cover to a sample by depositing consecutive drops of a solution on its surface, and allowing the solvent to evaporate.

With spray-coating, the polymer film, still in liquid form, is sprayed onto an application surface through the air. The assistance of ultrasound or high voltage electrical field may be applied.

As an alternative to solution processing, melt extrusion/molding of sodium-containing particle-polymer composites may be employed. Conventionally, extrusion is a high volume manufacturing process in which a raw plastic-like material is melted and formed into a continuous profile. Conventional extrusion produces items such as pipe/tubing, weather stripping, fence, deck railing, window frames, plastic films and sheet, thermoplastic coatings, and wire insulation.

Furthermore, the processing of the sodium-containing polymer composite films may include the use of appropriate plasticizers and/or other processing techniques (phase inversion) as well as post-treatments such as extraction and etching. Phase inversion here refers to the use of two immiscible phases to form a metastable suspension, which is used to form a desirable texture in a polymer film.

In another aspect, the sodium-containing polymer composite film may comprise several layers of individual polymer films (with sodium-containing particles), which have been deposited sequentially on top of one another. In the case of a multi-layer composite film, both the type of polymer and the concentration of sodium-containing particles in each layer may be the same or different. Stated alternatively, individual polymer layers may consist of different polymers (or different combinations of polymers) while the quantity of sodium-containing material in each of the individual layers need not be the same, so that a compositional "gradient" (with respect to sodium-containing particle concentration) is established.

In one variation, a multi-layer sodium-containing polymer composite film is fabricated using individual layers wherein a higher concentration of sodium-containing particles is contained within the polymer layer(s) near one surface of the film. In other words, this variation describes a sodium-containing polymer composite film (comprising individual layers) where the concentration of sodium-containing particles decreases (or increases) from one surface of the film (e.g., the top surface) to the bottom surface (or vice versa) and for which the gradient is achieved by varying the concentration of sodium-containing particles accordingly in each sequentially deposited layer (see FIG. 2E). Finally, the thicknesses of individual layers in the multi-layered film may be the same or different.

In general, the sodium-containing particles are obtained in a powder form through conventional processing methods, and may consist of spherical and/or irregularly shaped particles. In another aspect, the sodium-containing particles are in the form of sheets/platelets (FIG. 2C). The knowledge and capability for realizing sodium-containing particles such as NASICON materials would be understood by one with ordinary skill in the art.

The sodium-containing particles can be modified prior to their addition to polymer solution by methods including, but not limited to, surface doping with metal ions and/or surface modification with organic, inorganic and/or hybrid organic-inorganic moieties for the purposes of creating a favorable sodium-containing particle-liquid electrolyte interface, thus improving performance of the composite within the context of battery application.

NASICON is a typical $Na^+$ conductive solid electrolyte material selected as an example. Other, thio-NASICON materials such as $NaX_2(PS_4)_3$ (X=Ti, Ge, Zr, Sn), $Na_3PS_4$, or $Na_3(PO_4)_x(PS_4)_{1-x}$ (0<x<1) can be used as alternatives.

Figure 4:
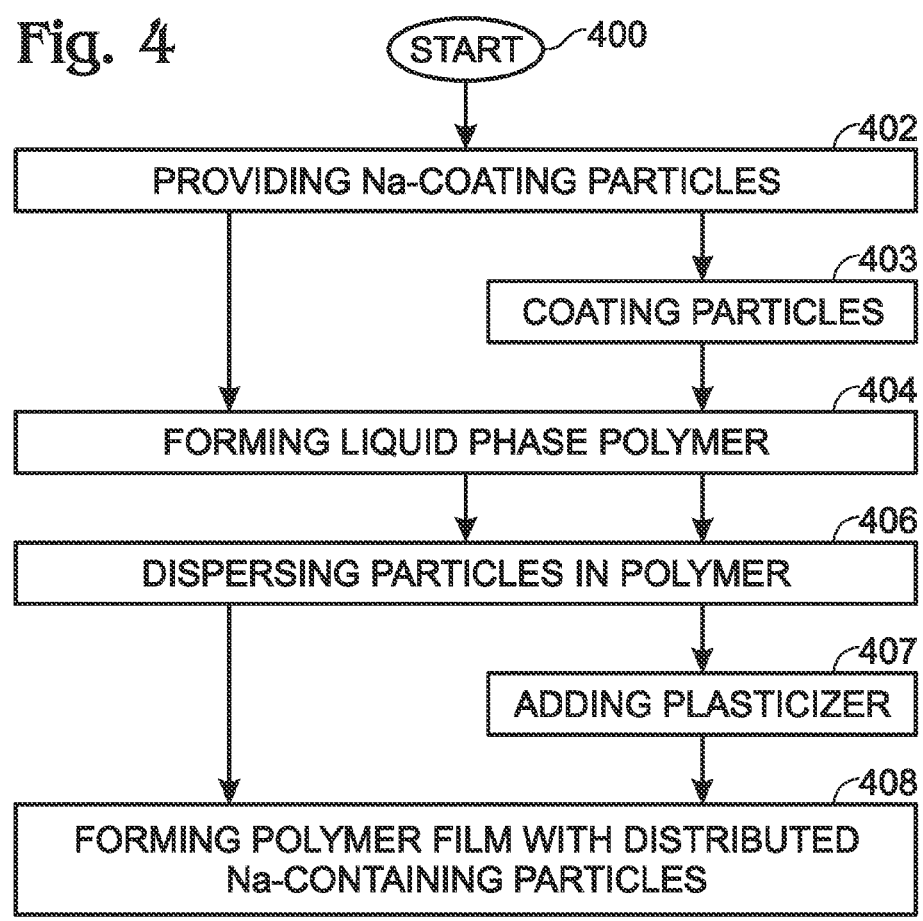
FIG. 4 is a flowchart illustrating a method for forming a sodium-containing particle electrolyte structure.

FIG. 4 is a flowchart illustrating a method for forming a sodium-containing particle electrolyte structure. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. FIGS. 1-3 may aid in the understanding of the flowchart. The method starts at Step 400.

Step 402 provides sodium-containing particles. Step 404 forms a liquid phase polymer by either dissolving the polymer in a solvent or melting the polymer. Step 406 disperses the sodium-containing particles in the liquid phase polymer. Step 408 forms a polymer film with sodium-containing particles distributed in the polymer film. Step 406 may be performed after Step 404 or simultaneously with Step 404. Further, dispersing the sodium-containing particles in the polymer in Step 406 may include the use of agitation, sonication, elevated temperatures, or a combination of the above-listed dispersion processes. Forming the polymer film with sodium-containing particles in Step 408 may include the use of a spin-coating, blade-casting, drop-casting, or spray coating process. In one aspect, Step 407 adds a plasticizer to the polymer film.

The sodium-containing particles provided in Step 402 may have a size in the range between 1 nanometer and 100 microns, and a size distribution in the range between one order of magnitude and five orders of magnitude. The sodium-containing particle shapes may be spherical, irregular, plate, or a combination of the above-listed shapes. The sodium-containing particles may be a material such as $Na_3Zr_2PSi_2O_{12}$ (NASICON) or thio-NASICON materials such as $NaX_2(PS_4)_3$, where X is titanium (Ti), germanium (Ge), zirconium (Zr), or tin (Sn), $Na_3PS_4$, or $Na_3(PO_4)_X(PS_4)_{1-X}$, where (0<X<1). In one aspect, Step 403 coats the sodium-containing particles with a dopant such as metal ions, organic moieties, inorganic moieties, or hybrid organic/inorganic moieties.

Forming the liquid phase polymer in Step 404 includes s a polymer material as follows: poly(ethylene oxide) (PEO), poly(acrylonitrile) (PAN), poly(methyl metacrylate) (PMMA), polyvinyl chloride (PVC), poly(vinylidene fluoride) (PVdF), poly(vinylidene fluoride-co-hexafluoropropylene) (PVdF), poly(tetrafluoroethylene) (PTFE), polyvinyl acetate) (PVAc), polyvinyl alcohol) (PVA), poly (styrene) (PS), poly(p-pheneylene oxide) (PPO), polyethylene terephthalate) (PET), polyvinyl pyrrolidinone) (PVP), poly (vinyl butyral) (PVB), polyethylene (PE), polypropylene (PP), poly(imides)s (PIs), poly(urethane)s (PUs), poly(siloxane), functional derivatives of the above-listed materials, and binary/ternary blends of the above-listed materials.

In one aspect, forming the polymer film in Step 408 includes forming a plurality of polymer film layers, where each polymer film layer includes sodium-containing particles. In one variation, the plurality of polymer film layers form a stack having a top anode layer and a bottom cathode layer. The percentage of sodium-containing particles in the polymer film layers is graded, increasing in percentage from the bottom cathode layer to the top anode layer. In another variation, the polymer materials used in each layer may vary.

A sodium-containing electrolyte structure, a battery using a sodium-containing electrolyte structure, and an associated sodium-containing electrolyte structure fabrication method are provided. Examples of particular materials and process steps have been presented to illustrate the invention. However, the invention is not limited to merely these examples. Other variations and embodiments of the invention will occur to those skilled in the art.

We claim:
1. A battery with a sodium-containing particle electrolyte structure, the battery comprising:
   an anode comprising a material selected from the group consisting of alkali metals, alkaline earth metals, carbon, metals capable of being alloyed with alkali and alkaline earth metals, intercalation oxides, electrochemically active organic compounds, and combinations of the above-listed materials;
   a cathode comprising $M1_YM2_Z(CN)_N \cdot MH_2O$;
   where M1 and M2 are transition metals;
   where Y is less than or equal to 1;
   where Z is less than or equal to 1;
   where N is less than or equal to 6;
   where M is less than or equal to 20;
   a sodium-containing particle electrolyte structure comprising:
   a polymer film including a plasticizer; and,
   sodium-containing particles distributed in the polymer film; and,
   wherein the plasticizer improves conductivity in the electrolyte structure by enhancing the dissociation of salts in the polymer.

2. The battery of claim 1 wherein the sodium-containing particles have a size in a range between 1 nanometer and 100 microns, and a size distribution in a range between one order of magnitude and five orders of magnitude.

3. The battery of claim 1 wherein the polymer film is a material selected from the group consisting of poly(ethylene oxide) (PEO), poly(acrylonitrile) (PAN), poly(methyl metacrylate) (PMMA), poly(vinyl chloride) (PVC), poly (vinylidene fluoride) (PVdF), poly(vinylidene fluoride-co-hexafluoropropylene) (PVdF), poly(tetrafluoroethylene) (PTFE), poly(vinyl acetate) (PVAc), poly(vinyl alcohol) (PVA), poly(styrene) (PS), poly(p-pheneylene oxide) (PPO), poly(ethylene terephthalate) (PET), poly(vinyl pyrrolidinone) (PVP), poly (vinyl butyral) (PVB), polyethylene (PE), polypropylene (PP), poly(imides)s (PIs), poly(urethane)s (PUs), poly(siloxane), functional derivatives of the above-listed materials, and binary/ternary blends of the above-listed materials.

4. The battery of claim 1 further comprising:
   a plurality of polymer film layers; and,
   wherein each polymer film layer includes sodium-containing particles and a plasticizer.

5. The battery of claim 4 wherein the plurality of polymer film layers form a stack having a top anode layer and a bottom cathode layer; and,
   wherein the percentage of sodium-containing particles in the polymer film layers is graded, increasing in percentage from the bottom cathode layer to the top anode layer.

6. The battery of claim 4 wherein the plurality of polymer film layers are formed from a corresponding plurality of polymer materials.

7. The battery of claim 1 wherein the sodium-containing particles have a shape selected from the group consisting of spherical, irregular, and combinations of the above-listed shapes.

8. The battery of claim 1 wherein the sodium-containing particles are coated with a dopant selected from the group consisting of metal ions, organic moieties, inorganic moieties, and hybrid organic/inorganic moieties.

9. The battery of claim 1 wherein the sodium-containing particles are a material selected from the group consisting of $Na_3Zr_2PSi_2O_{12}$ (NASICON) and thio-NASICON materials selected from a group consisting of $NaX_2(PS_4)_3$, where X is selected from a group consisting of titanium (Ti), germanium (Ge), zirconium (Zr), and tin (Sn), $Na_3PS_4$, and $Na_3(PO_4)_X(PS_4)_{1-X}$, where (0<X<1).

10. The battery of claim 1 wherein the sodium-containing particles have a plate shape.

* * * * *